June 19, 1962    M. W. KESTNER    3,039,805
CLAMPING DEVICE
Filed July 23, 1959    2 Sheets-Sheet 1

INVENTOR.
MATTHEW W. KESTNER
BY Hudson Boughton
Williams, David & Hoffman
ATTORNEYS June 19, 1962  M. W. KESTNER  3,039,805
CLAMPING DEVICE
Filed July 23, 1959  2 Sheets-Sheet 2

INVENTOR.
MATTHEW W. KESTNER
BY Hudson, Boughton,
Williams, David & Hoffmann
ATTORNEYS United States Patent Office 3,039,805
Patented June 19, 1962

3,039,805
CLAMPING DEVICE
Matthew W. Kestner, Cleveland, Ohio, assignor to The American Ship Building Company, Cleveland, Ohio, a corporation of New Jersey
Filed July 23, 1959, Ser. No. 828,973
7 Claims. (Cl. 292—256.5)

This invention relates to clamping devices and, more particularly, to a clamping device of the kind used to releasably secure a member to an associated support, the member frequently being a cover and the support frequently being a structure having an opening to be closed by the cover.

The clamping device provided by this invention is one which can be used to advantage wherever the member or cover is subject to frequent removal and where actuation of the clamping device with minimum manual work and time expenditure is desirable. Although the clamping device of this invention is applicable to numerous different members and forms of covers, it is especially suitable for the hatch covers of ships and other cargo carrying vehicles, and is described hereinafter for such hatch cover use without any intention, however, to limit the invention precisely thereto.

An object of this invention is to provide a clamping device which is of a simple construction comprising a minimum number of parts adapted to be economically produced and readily assembled, and which can be quickly and easily manipulated to its locking and releasing conditions.

To further explain the practical aspect of the clamping device provided by this invention, it is pointed out that the hatch covers of ships and other cargo vehicles are required to be frequently removed from the hatch openings to accommodate the loading and unloading of cargo and, accordingly, considerable manual work is involved in locking and unlocking the securing clamps for such covers. Because of its simplicity and ease of operation, the clamping device of the present invention facilitates the performance of this work, and moreover, the device is of a construction such that when it is in its installed position it occupies only a small amount of space and is in an out-of-the-way location for minimum interference and damaging contact therewith, as well as for minimum likelihood of injurious personal contact by bumping thereagainst.

In connection with the present trend toward "containerization" in the handling and shipping of cargo, hatch covers of the so-called "pontoon" type are frequently used on ships so that the flat top of the cover can be used as a location for additional cargo after the hold has been filled. The clamping device of this invention also has the advantage that, when it is used in conjunction with such a pontoon type of cover and is in its locked condition, all parts of the device lie below the top portion of the cover so that during the placing of such additional cargo on, or removing the same from, the top of the hatch cover there will be little likelihood of damaging engagement with the clamping device.

The clamping device of this invention aims to achieve, and does successfully achieve, the objects and advantages referred to above. Various other objects and advantages of this invention will be apparent in the following detailed description and in the accompanying sheets of drawings forming a part of this specification and in which, FIG. 1 is a partial thwartship section taken through the deck and hatch cover structure of a ship and showing the clamping device of this invention applied to a hatch cover;

The novel clamping device 10 of this invention is shown, by way of example, as applied to a hatch cover 11 of the above-mentioned pontoon type and provides an efficient clamping means for releasably securing the cover on a support structure or coaming 12 for closing the hatch opening 13 of the latter. The cover 11 and the coaming 12 will first be briefly described and the construction and manner of operation of the clamping device 10 will be described later.

Figure 1:
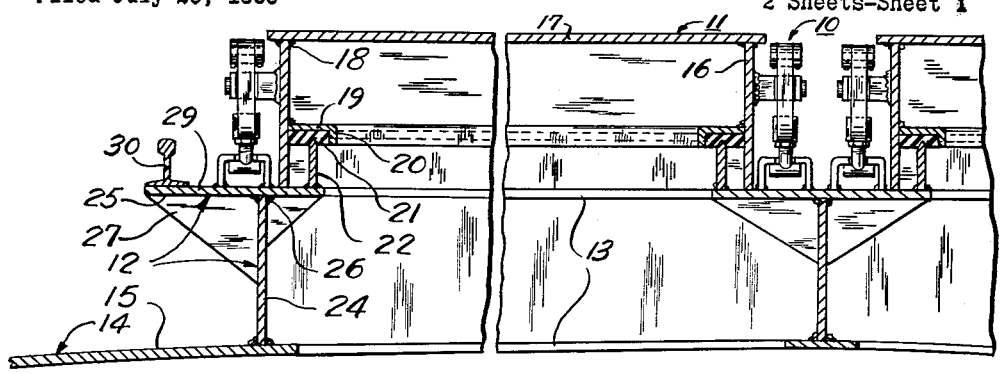

The cover 11 comprises a quadrangular body having upright side walls 16 and a substantially horizontal top wall 17 secured to such side walls as by welding 18. The cover 11 is also provided with a laterally projecting internal flange 19 which is of a cross-sectional shape to provide a downwardly facing channel recess 20 in which a strip 21 of suitable packing material is disposed for pressing against the knife edge of an upright sealing flange 22 of the coaming 12, when the cover is in an applied position closing the hatch opening 13 as shown in FIG. 1.

The coaming 12 is here shown as comprising upright plates 24 secured to the deck 15 outwardly of the hatch opening 13 and horizontal plates 25 secured to the tops of these upright plates, as by weld connections 26 and gusset plates 27, and forming a ledge 29 extending around the hatch opening at an elevation above the deck. The ledge 29 forms a support for the sealing flange 22 and also forms a support for rails 30 extending fore and aft of the ship and on which hoisting apparatus can be moved for handling the hatch covers 11.

A suitable number of the clamping devices 10 are mounted on the hatch cover 11 and are movable therewith, as further explained hereinafter.

The clamping device 10 comprises a connecting member in the form of an anchor bracket 32 adapted for attachment to the supporting structure or coaming 12 and a mounting means in the form of a mounting bracket 33 adapted for attachment to the side wall 16 of the cover 11. The clamping device 10 also comprises a clamp body 34 and an actuating member in the form of a toggle link 35 supporting the clamp body and swingably connecting the same with the mounting bracket 33. Additionally, the clamping device 10 comprises a connecting member or thrust element 36 carried by the clamp body 34 and adapted for co-operable engagement with the anchor bracket 32.

Figures 2, 3:
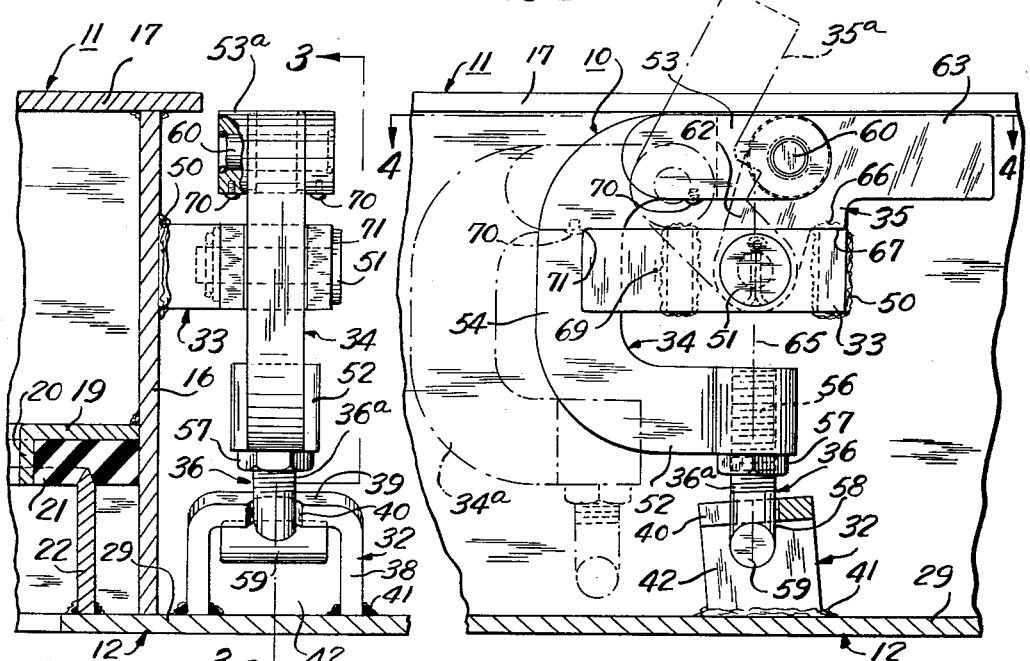
FIG. 2 is a partial vertical section corresponding with a portion of FIG. 1, but on a larger scale and showing one of the clamping devices in end elevation and with the device in its locked condition.
FIG. 3 is another partial vertical section taken on section line 3—3 of FIG. 2 and showing the clamping device mainly in side elevation.
Figure 4:
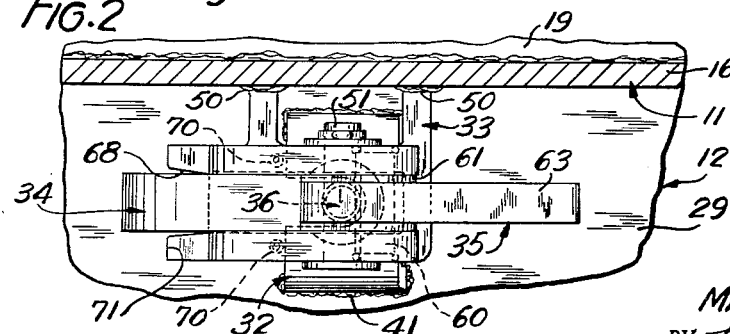
FIG. 4 is a partial horizontal section taken on section line 4—4 of FIG. 3 and showing the clamping device in plan view.

The anchor bracket 32 is here shown as being a hollow member of an inverted U-shape having parallel upright side walls 38 and a transverse top wall 39 provided with a slot 40. The anchor bracket 32 is secured to the ledge 29 of the coaming 12, as by means of welds 41, and co-operates with the ledge in defining a pocket or recess 42 with which the slot 40 communicates and into which a portion of the thrust element 36 is movable as explained hereinafter. The hollow bracket 32 is preferably installed in a tilted or cocked position to serve as a hook member and so that the top wall 39 thereof slopes in a direction to present the open end of the slot 40 in a somewhat downwardly pointing relation, as shown in FIGS. 2 and 3.

Figure 5:
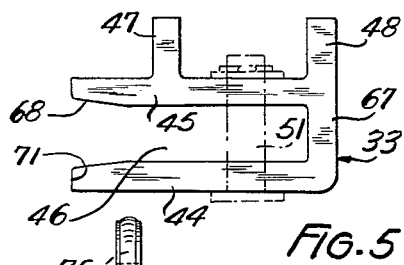
FIG. 5 is a plan view showing the mounting bracket of the clamping device in a detached relation.

The mounting bracket 33 is here shown as being a fork-shaped member (see FIG. 5) having spaced side walls or arms 44 and 45 and a slot or fork recess 46 extending thereinto between such arms. The mounting bracket 33 is also provided with a pair of spaced attaching lugs 47 and 48 projecting from the arm 45 and adapted to be attached to the side wall 16 of the cover 11, as by means of welds 50, for the attachment of the clamping device 10 to such side wall. A pivot member, here shown as pivot pin 51, extending through the arms 44 and 45 and across the recess 46 forms a fulcrum for swingably supporting the toggle link 35.

The clamp body 34 is a C-shaped member which may be of any suitable form of construction and is somewhat resilient in character for a purpose to be explained hereinafter. The clamp body 34 has spaced lower and upper end portions or arms 52 and 53 and an intermediate connecting portion 54 connecting such end portions. The lower end portion 52 is provided with a threaded opening 56, and when the thrust element 36 is in the form of a bolt or screw as here represented, the stem 36ᵃ thereof is engaged in such threaded opening and retained in a desired position of adjustment by a suitable lock nut 57.

The thrust element 36 can be of any suitable form and, as just above mentioned, is here shown as being in the form of a screw carried by the clamp body 34. The stem 36ᵃ of the screw is provided at the lower end thereof with a headed portion, in this case a T-shaped portion 58, for co-operation with the anchor bracket 32. The T-shaped portion 58 includes a transverse bar 59 which is movable into the recess 42 of the anchor bracket when the stem portion of the thrust member is received in the slot 40 of the bracket, as shown in FIGS. 2 and 3.

The upper end portion 53 of the clamp body 34 is a yoke-shaped portion having a pair of spaced arms 53ᵃ in which a transverse pivot pin 60 is suitably mounted and retained. The pivot pin 60 forms an actuating pivot by which the toggle link 35 imparts movement to the clamp body 34, and also forms a supporting connection by which the clamp body is supported on the link for actuation thereby. Suitable spacer washers 61 are provided on the pivot pin 60 on opposite sides of the link 35.

The toggle link 35 is in the form of a lever, preferably a bell crank lever, having a lower arm 62 swingably fulcrumed on the transverse pivot pin 51 of the mounting bracket 33 and an angularly disposed upper arm 63 projecting outwardly from the pivot pin 60. The link 35 is mounted in the bracket 33 so that the major portion of the link extends thereabove with the projecting arm 63 forming an actuating portion to which a manual actuating force can be applied for manipulating the clamping device 10 in the manner explained hereinafter.

Figure 6:
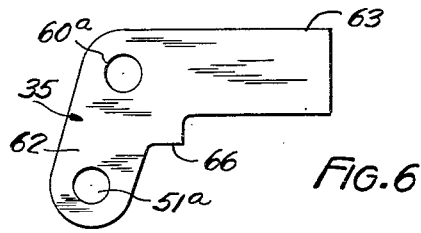
FIG. 6 is a side elevation showing the toggle link of the clamping device in a detached relation.

The upper end portion 53 of the clamp body 34 is connected with the link 35 by the pivot pin 60, as has been indicated above, so that the clamp body is supported by the mounting bracket 33 through this link and is movable by the latter to engaged and released positions relative to the anchor bracket 32 when the link is swung on its pivot pin 51 to locking and releasing positions. As shown in FIG. 6, the link 35 is provided with suitable spaced openings 51ᵃ and 60ᵃ to accommodate the pivot pins 51 and 60.

The installed position of the clamping device 10 is with the clamp body 34 located adjacent the side wall 16 of the cover 11 and in a parallel relation thereto. FIGS. 2 and 3 of the drawings show the clamping device 10 in full lines in its locked or securing position at which time the T-shaped head portion 58 of the thrust element 36 is engaged in the anchor bracket 32 and the upper end portion 53 of the clamp body lies about the mounting bracket 33 with the axis of the pivot pin 60 located to the right of a center line or vertical axis 65 which is an extension of the axis of the stem of the thrust element 36 and passes through the axis of the pivot pin 51. The actuating arm or lug 63 of the toggle link 35 extends in a lateral or horizontal direction away from the pivot pin 60 and is located in this position by co-operating stop elements 66 and 67 provided on the link and the mounting bracket 33.

At this time the intermediate portion 54 of the clamp body 34 is engaged in the fork recess 46 of the mounting bracket 33, as shown in FIG. 3, which prevents rattling or accidental displacement of the clamp body when the clamping device 10 is in its locked condition as here illustrated. The adjacent sides of the outer end portions of the arms 44 and 45 of the mounting bracket 33 are preferably provided with beveled portions or chamfers 68 to facilitate the movement of the intermediate body portion 54 into the fork recess 46.

In FIG. 3 a phantom line position 35ᵃ is shown for the toggle link 35 and represents the releasing position for this link and corresponds with the released or unlocked position 34ᵃ of the clamp body.

When the hatch cover 11 is moved to the desired position for closing the hatch opening 13, it assumes the location shown in FIG. 1 with the packing strip 21 pressed into sealing co-operation with the top edge of an upright flange 22, here shown as being a beveled edge, by reason of the weight of the cover. Since the clamping devices 10 are mounted on the cover 11, the placing of the cover in the proper position on the coaming 12 also locates the individual clamping devices 10 in a proper initial position relative to their associated anchor brackets 32.

Figure 8:
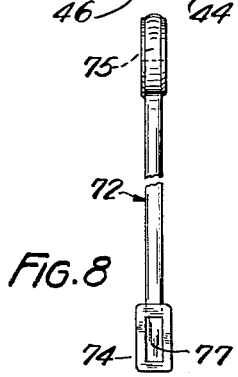
FIG. 8 is an end view of the socket end of the operating tool.
Figure 7:
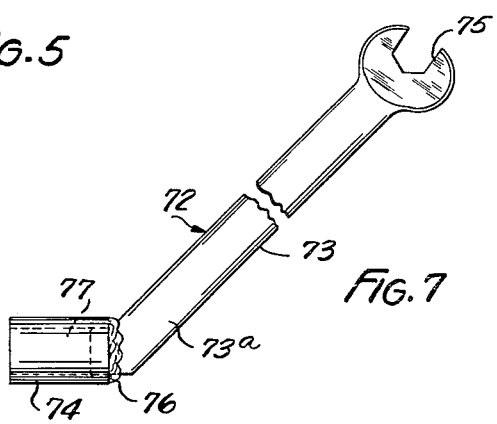
FIG. 7 is a side elevation showing an operating tool with which the clamping device can be actuated to its locking and releasing conditions.

This initial position for the clamping devices 10 relative to their anchor brackets 32 is represented by the phantom line position 34ᵃ of the clamp body shown in FIG. 3, at which time the T-shaped head 58 of the thrust member 36 is located to the left of, and below, the sloping top wall 39 of the anchor bracket. At this time the pivot pin 60 lies to the left of the center line 65 and the actuating arm 63 of the toggle link 35 projects above the top wall 17 of the hatch cover where it will be readily accessible for application of the socket end of a suitable actuating tool thereto. Such a tool is shown in FIGS. 7 and 8 and described hereinafter.

By means of the tool applied to the actuating arm 63 of the toggle link 35, a clockwise swinging movement is imparted to the link about the axis of the pivot pin 51 thereby causing the pivot pin 60 to be shifted along an arcuate path and across the center line 65 by moving through and beyond a dead center position. This clockwise swinging of the toggle link 35 brings the same to its locked position illustrated in full lines in FIG. 3 and which position is determined by the co-operative engagement of the stop elements 66 and 67.

The clockwise swinging of the toggle link 35 also imparts a combined lifting and lateral movement to the clamp body 34 by which the T-shaped head portion 58 of the thrust element 36 is shifted into the anchor bracket 32 in a manner to cause the transverse bar 59 to be drawn up against the underside of the top wall 39 of the bracket with a pulling force thereagainst. Because of the resilient character of the clamp body 34 some springing thereof takes place as the toggle link 35 is swung to its locking position and this springing of the clamp body causes the T-shaped head portion 58 of the thrust element 36 to be retained in a tight holding engagement with the anchor bracket 32.

The tilted position of the anchor bracket 32 also contributes to the achievement and maintenance of a secure holding connection of the thrust element 36 with this bracket. The threaded connection indicated at 56 and the lock nut 57 provide for adjustment of the thrust element 36 for co-operation thereof to best advantage with the anchor bracket 32 when the clamping device 10 is actuated to its locked condition as explained above.

To facilitate the movement of the T-shaped head portion 58 of the thrust element 36 into the anchor bracket 32, the clamp body 34 is provided with control stop means for co-operation with the mounting bracket 33 and which stop means is here shown as comprising projections 70 on the underside of the end portion 53, in this case, the projecting heads of screws mounted in such end portion. These stop elements 70 come into engagement with the upper end corners 71 of the arms 44 and 45 of the mounting bracket 33 when the clamp body is shifted toward the right, as seen in FIG. 3, by the action of the toggle link 35.

The engagement of the stop elements 70 with the corners 71 under these circumstances causes the lateral translatory shifting movement of the clamp body 34 to be temporarily interrupted so that the next succeeding portion of the clamp body movement produced by the swinging of the toggle link 35, is a rocking or swinging of the clamp body about the corners 71 as a fulcrum means by which the T-shaped head portion 58 of the thrust element 36 is moved into the recess 42 of the anchor bracket 32. By the time that the head of the thrust element 36 has been thus engaged in the anchor bracket 32, the lifting action imparted to the clamp body 34 by the swinging movement of the toggle link 35 causes the stop elements 70 to move over and past the corners 71. The rocking of the clamp body 34 about the corners 71 as a fulcrum is accentuated by reason of the fact that the center of gravity of the clamping device 10 is to the left of the center line 65 and is approximately at the location indicated by the point 69 in FIG. 3.

The stop elements 70 also prevent undesirable swinging of the clamp body 34 during the movement of the cover 11 to its position on the coaming 12 and which swinging might otherwise cause premature engagement of the T-shaped head portion 58 in the anchor bracket 32.

The construction of the clamping device 10, as described above, also provides for assembly thereof in an opposite hand relation on the cover 11. This is accomplished by merely attaching the mounting bracket 33 to the side wall 11 in an inverted relation from that shown in FIG. 2.

FIGS. 7 and 8 of the drawings show an actuating tool 72 by which the toggle link 35 can be conveniently actuated to its locking and releasing positions, as explained above. The tool 72 is here shown as comprising a wrench 73 of the end-wrench type and a socket member or sleeve 74 secured to the end of the handle 73ᵃ of the wrench. The wrench 73 is here shown as having a head-receiving recess 75 of a size and shape suitable for application to the lock nut 57 of the thrust element 36. The socket member 74 is secured to the handle 73ᵃ in a suitable angular relation thereto, as by means of a weld 76, and has a pocket or recess 77 therein of a size and shape to accommodate the arm projection or lug 63 of the toggle link 35 when the tool is applied to the latter.

Figure 9:
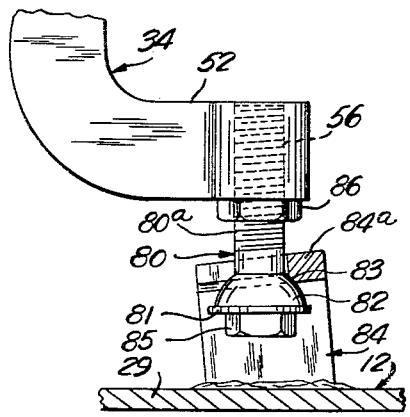
FIG. 9 is a fragmentary side elevation showing a modified form of construction for the thrust means of the clamping device.

FIG. 9 of the drawings shows a modified construction for the connecting means or thrust element of the clamp body 34. This modified construction comprises a screw 80 having the threaded portion of its stem 80ᵃ engaged in the threaded opening 56 of the lower end portion 52 of the clamp body 34. The screw 80 carries a head 81 having a convex portion 82 of a suitable shape, such as a semispherical shape, for seating engagement with a concave seat 83 provided on the underside of the top wall 84ᵃ of the anchor bracket 84. The screw 80 is also provided with a head portion 85 of a polygonal shape which is formed integral with the rounded head portion 82 and to which a suitable wrench can be applied for adjusting the screw relative to the clamp body. A suitable lock nut 86 is also provided on the threaded stem 80ᵃ.

Figure 10:
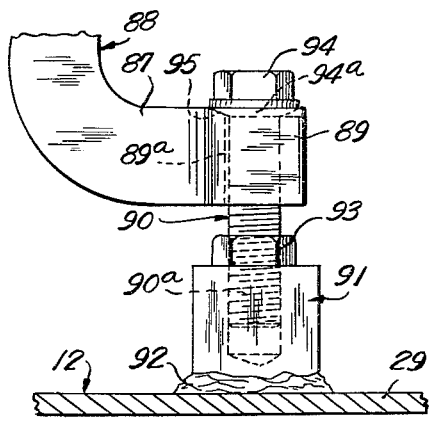
FIG. 10 is another such fragmentary side elevation showing a second modified construction for the thrust means.

FIG. 10 shows another modified construction for the thrust element which connects the clamp body with the anchor bracket. In this modified construction the lower end portion 87 of a C-shaped clamp body 88 has a free end 89 of a forked shape. The thrust element 90 of this modified construction is a bolt having a threaded stem 90ᵃ engaged in a nut-like anchor member 91 which is secured to the ledge portion 29 of the coaming 12 by a welded connection 92. The forked shape of the free end 89 provides an open slot 89ᵃ for receiving the stem of the thrust element 90.

The threaded connection of the stem 90ᵃ with the anchor member 91 provides for adjustment of the thrust element 90 to a desired position in which it is adapted to be secured by a suitable lock nut 93. When the clamp body 88 is moved to its locking position by the action of the toggle link, the forked end 89 engages the thrust element 90 in a straddling relation to the stem thereof and is lifted into holding engagement with the underside of the head 94 of the thrust element.

The edges of the forked end 89 extending along the slot 89ᵃ are beveled or chamfered as indicated at 95. The head 94 has a co-operating bevel or rounded seat 94ᵃ thereon which is rockably engageable by the bevel on the forked end 89 when the clamp body 88 is tightened thereagainst.

From the accompanying drawings and the foregoing detailed description it will now be readily understood that this invention provides a clamping device of a simple and practical form comprising a relatively small number of parts and which, by reason of its being mounted on the cover, is movable with the latter into a co-operating relation to the associated anchor member located on the cover support structure or coaming. It will now also be recognized that this novel clamping device can be quickly and easily actuated to its locking and releasing conditions and that the actuating portion of the swingable toggle link is readily accessible for this purpose.

Additionally it will be recognized that this novel clamping device occupies only a minimum amount of space and is located adjacent the side wall of the cover so as to be in an out-of-the-way position where it will not be subject to damaging blows or be likely to cause personal injury by crew members bumping thereagainst. It will likewise be recognized that when this clamping device is in its locked or securing condition, all portions of the device lie below the top of the cover so that when cargo units or containers are placed on the top of the cover for transportation in that position, there will be little likelihood of damaging engagement of such cargo units or containers with any portion of the clamping device.

Although the clamping device of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. A clamping device for releasably clamping a movable structure against a support structure; comprising a holding member adapted for attachment to one of said structures and having a first thrust means thereon; the other of said structures having a side wall; a mounting bracket adapted for attachment to said side wall; a substantially C-shaped movable clamp member of limited flexibility and having spaced coextending end portions connected by an intermediate connecting portion; a second thrust means on one of said end portions and mutually engageable with said first thrust means for the transmission of clamping force therebetween along a given directional line; actuating means comprising a toggle link having a body portion and first and second lever arms projecting therefrom; a first pivot means connecting one of said arms with the bracket on a pivot axis lying substantially on said directional line when said first and second thrust means are mutually engaged; and a second pivot means connecting said body portion of the link with the other end portion of said clamp member; said link being swingable on said first pivot means to toggle-locked and toggle-unlocked positions by movement of said second pivot means from one side to the other of said directional line in response to actuating force applied to the other of said arms; said clamp member lying in a plane extending parallel to said side wall and having a clamping position in which said first and second thrust means are mutually engaged and said end portions lie on opposite sides of said mounting bracket, and said clamp member being shiftable to and from said clamping position by such swinging of the link.

2. A clamping device as defined in claim 1 wherein said bracket is elongated transversely of said directional line; and guide means on one end of said bracket for guiding and restraining co-operation with said connecting portion of said clamp member in response to movement of the clamp member to said clamping position.

3. A clamping device as defined in claim 2 wherein said guide means comprises projection means on said bracket and extending in a transverse relation to said connecting portion when the clamp member is in said clamping position.

4. A clamping device as defined in claim 2 wherein said guide means comprises forked projection means on said bracket and having a guide slot in which said connecting portion is receivable.

5. A clamping device for releasably clamping a movable structure against a support structure; comprising a holding member adapted for attachment to one of said structures and having a first thrust means thereon; the other of said structures having a side wall; a mounting bracket adapted for attachment to said side wall; a substantially C-shaped movable clamp member of limited flexibility and having spaced coextending end portions connected by an intermediate connecting portion; a second thrust means on one of said end portions and mutually engageable with said first thrust means for the transmission of clamping force therebetween along a given directional line; actuating means comprising a toggle link having a body portion and first and second lever arms projecting therefrom; a first pivot means connecting one of said arms with said mounting bracket on a pivot axis lying substantially on said directional line when said first and second thrust means are mutually engaged; said mounting bracket being elongated in a direction transverse to said directional line; a second pivot means connecting said body portion of the link with the other end portion of said clamp member; said link being swingable on said first pivot means to toggle-locked and toggle-unlocked positions by movement of said second pivot means from one side to the other of said directional line in response to actuating force applied to the other of said arms; said clamp member lying in a plane extending parallel to said side wall and having a clamping position in which said end portions extend in the same general longitudinal direction as, and lie on opposite sides of, said mounting bracket and said clamp member being shiftable to and from said clamping position by swinging of said link substantially in said plane; projecting guide means on one end of said mounting bracket and cooperable with said connecting portion in response to movement of the clamp member to its clamping position; said link being a bell crank lever; and stop means co-operably engageable between said link and the other end portion of said mounting bracket when said link is in its toggle-locked position.

6. A clamping device as defined in claim 5 wherein said movable structure is a hatch cover having said side wall on one upright side thereof, and said first thrust means comprises a hollow bracket attached to said support structure; said second thrust means having a head portion receivable in said hollow bracket.

7. A clamping device as defined in claim 6 and comprising other stop means on said clamp member and engageable with said mounting bracket for causing tilting of the clamp member during movement thereof toward said clamping position to thereby facilitate engagement of said head portion in said hollow bracket.

References Cited in the file of this patent

UNITED STATES PATENTS

| | | |
|---|---|---|
| 987,906 | Montross | Mar. 28, 1911 |
| 1,350,713 | Ferdon | Aug. 24, 1920 |
| 1,586,829 | Miller | June 1, 1926 |
| 1,610,342 | Wertheim et al. | Dec. 14, 1926 |
| 1,836,544 | Moore | Dec. 15, 1931 |
| 1,863,340 | Hynes | June 14, 1932 |
| 1,863,863 | Marbach | June 21, 1932 |
| 2,583,053 | Kestner et al. | Jan. 22, 1952 |
| 2,704,218 | Claud-Mantle | Mar. 15, 1955 |
| 2,791,455 | Greer et al. | May 7, 1957 |

FOREIGN PATENTS

| | | |
|---|---|---|
| 129,837 | Austria | Oct. 10, 1932 |
| 552,543 | Great Britain | Apr. 13, 1943 |